H. McKINNON.
VEHICLE DRIVE.
APPLICATION FILED JAN. 18, 1919.

1,309,074.

Patented July 8, 1919.

Hector McKinnon, Inventor

Witness

By C. A. Snow & Co.
Attorneys

UNITED STATES PATENT OFFICE.

HECTOR McKINNON, OF EUREKA, CALIFORNIA.

VEHICLE-DRIVE.

1,309,074.   Specification of Letters Patent.   Patented July 8, 1919.

Application filed January 18, 1919. Serial No. 271,821.

*To all whom it may concern:*

Be it known that I, HECTOR MCKINNON, a citizen of the United States, residing at Eureka, in the county of Humboldt and State of California, have invented a new and useful Vehicle-Drive, of which the following is a specification.

It is the object of this invention to provide a simple, compact and strong means whereby motion may be transmitted to the front wheels of a vehicle, such as an automobile.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
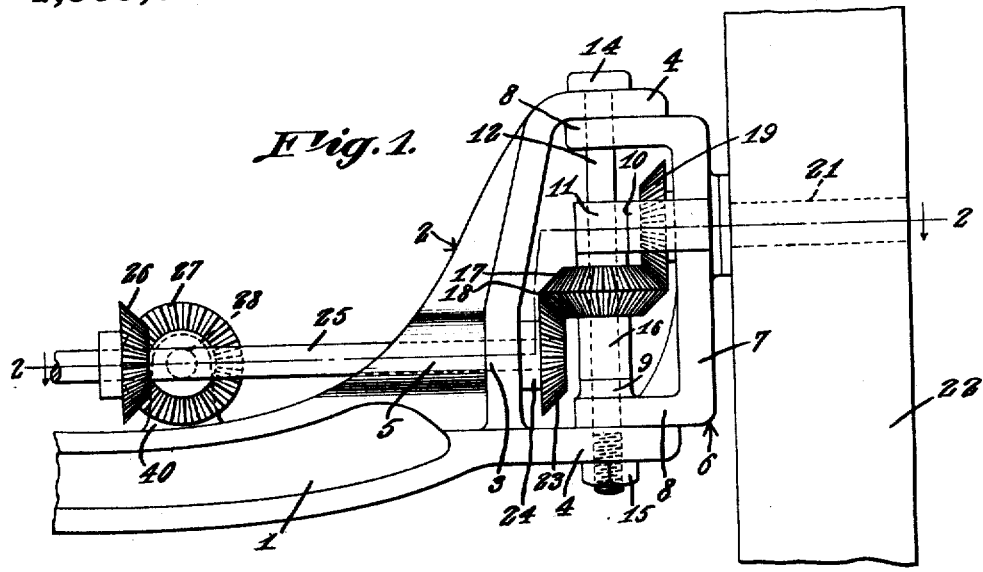
Figure 2:
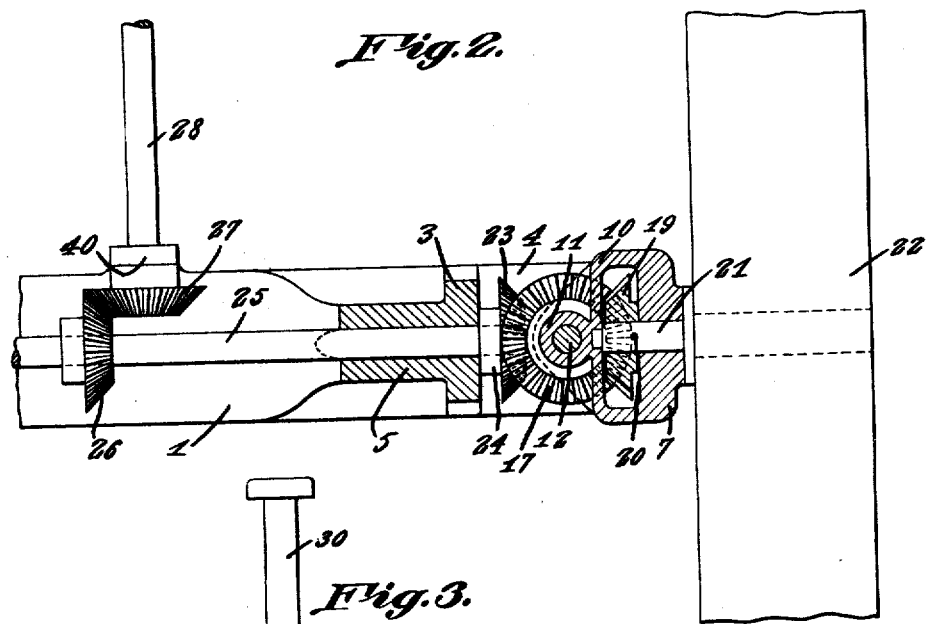
Figure 3:
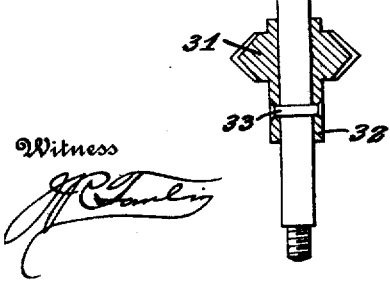

Figure 1 shows in elevation, a device constructed in accordance with the invention; Fig. 2 is a section on the line 2—2 of Fig. 1; and Fig. 3 is a sectional detail showing a modification.

In carrying out the invention as disclosed in Figs. 1 and 2, the numeral 1 indicates a portion of the front axle of an automobile, the front axle including a U-shaped head 2 comprising an upright 3 and outwardly extended arms 4. The upright 3 of the head is supplied with a bearing 5.

The numeral 6 designates a U-shaped yoke, including an upright 7, and arms 8, the arms 8 being received between the arms 4 of the head 2, the lower arm 8 having a boss 9. The upright 7 of the yoke 6 is supplied with an inwardly projecting loop-shaped bracket 10, the inner end portion of which carries a bearing 11, the axis of which is vertically disposed. A shaft 12 passes through the arms 4 and 8 and through the bearing 11 and includes a head 14 engaging one of the arms 4, there being a nut on the shaft 15, engaging the other of the arms 4, the shaft thus being clamped against rotation, but being properly designated as a shaft, because it carries a rotating part hereinafter described. It will be obvious that the shaft 12 forms a pivotal connection between the yoke 6 and the head 2 of the front axle 2, so that the vehicle may be steered in the usual way, by shifting the front wheels.

A sleeve 16 is journaled for rotation on the shaft 12 and is located between the bearing 11 and the boss 9. The sleeve 16 has fixed thereto, or formed integrally therewith, a gear wheel, including integrally fashioned beveled pinions 17 and 18 which taper in opposite directions. The pinion 17 meshes into a pinion 19, located within the loop-shaped bracket 10 and secured as indicated at 20 to a stub axle 21 journaled for rotation in the upright 7 of the yoke 6, the outer end of the stub axle carrying a ground wheel 22.

A pinion 23 meshes into the beveled pinion 18 and includes a hub 24 coacting with the upright 3 of the head 2 of the front axle 1, the pinion 23 being carried by a shaft 25 journaled for rotation in the bearing 5. A beveled pinion 26 is secured to the shaft 25 and meshes into a beveled pinion 27 on a shaft 28 journaled in a bearing 40 on the axle 1, there being as many of the bearings 40 as is considered expedient or necessary. The drawings show but one end of the axle 1, but it is to be understood that the opposite end of the axle is constructed as above described.

In practical operation, the drive shaft 28 is rotated from an engine or other source of power, motion being transmitted to the shaft 25 by way of the beveled pinions 27 and 26. The shaft 25 drives the beveled pinion 23, and the latter, through the instrumentality of the pinion 18, rotates the sleeve 16 on the shaft 12, and rotates the pinion 17 which is formed integrally with the pinion 18. From the pinion 17, motion is transmitted to the pinion 19, to the stub axle 21 and to the ground wheel 22.

It will be obvious from the foregoing, that the structure hereinbefore set forth is simple in construction, of few parts of great strength, and compact.

It has been stated that the shaft 12 is fixed against rotation. This construction, however, is not mandatory. Thus, as indicated in Fig. 3, the shaft 30, corresponding to the shaft 12, may be rotatable in the parts 4 and 8, the numeral 31 designating a double pinion, like the member 17—18 the pinion 31 having a sleeve 32 secured at 33 to the shaft 30, which is rotatable, as aforesaid.

Although the device forming the subject matter of this application has been described as being used in connection with the forward axle of the vehicle, it is obvious that the structure may be used on the rear axle of the vehicle, as well, and when used on the rear axle, the body of the vehicle will be lowered and the center of gravity will be lowered accordingly.

Having thus described the invention, what is claimed is:—

1. In a device of the class described, a vehicle axle comprising a head having arms; a yoke including an upright, and arms coacting with the arms of the axle head, the upright being provided with an inwardly projecting loop-shaped bracket having a bearing; a shaft connecting the arms of the yoke and of the axle head for relative pivotal movement and passing through the bearing; a gear mounted on the shaft between one arm and the bearing and comprising integrally formed beveled pinions; a stub axle journaled in the upright of the yoke; a ground wheel on the outer end of the stub axle; a beveled pinion on the inner end of the stub axle within the bracket and meshing into one of the integrally formed pinions; a shaft journaled in the head; a pinion on the last specified shaft and meshing into the other of the integrally formed pinions; and means for driving the last specified shaft.

2. In a device of the class described, a vehicle axle comprising a head having arms; a yoke including an upright, and arms coacting with the arms of the axle head, the upright being provided with an inwardly projecting loop-shaped bracket having a bearing; a shaft connecting the arms of the yoke and the arms of the axle head for relative movement, the shaft being extended through the bearing and being fixed in the arms of the head; a sleeve journaled for rotation on the shaft and located between one arm of the yoke and the bearing; a gear mounted on the sleeve and comprising integrally formed beveled pinions; a stub axle journaled in the upright of the yoke; a ground wheel on the outer end of the stub axle; a beveled pinion on the inner end of the stub axle within the bracket and meshing into one of the integrally formed pinions; a shaft journaled on the head; a pinion on the last specified shaft and meshing into the other of the integrally formed pinions; and means for driving the last specified shaft.

In testimony that I claim the foregoing as my own, I have hereto affixed my signature in the presence of two witnesses.

HECTOR McKINNON.

Witnesses:
J. R. LONE,
JOHN O'NEILL.

Copies of this patent may be obtained for five cents each, by addressing the "Commissioner of Patents, Washington, D. C."